United States Patent
Kamei et al.

(10) Patent No.: US 8,418,571 B2
(45) Date of Patent: Apr. 16, 2013

(54) ENGINE STARTER

(75) Inventors: Koichiro Kamei, Tokyo (JP); Hidekazu Katayama, Tokyo (JP); Kazuhiro Odahara, Tokyo (JP); Mutsuhiro Ichioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1126 days.

(21) Appl. No.: 11/943,978

(22) Filed: Nov. 21, 2007

(65) Prior Publication Data

US 2008/0289446 A1 Nov. 27, 2008

(30) Foreign Application Priority Data

May 22, 2007 (JP) .................................. 2007-135391

(51) Int. Cl.
*F02N 15/06* (2006.01)

(52) U.S. Cl.
USPC .................................................................. 74/6

(58) Field of Classification Search ............ 74/7 C, 74/6, 7 R, 7 A, 7 B, 7 D, 7 E, 8, 9; 384/625
See application file for complete search history.

(56) References Cited

U.S. PATENT DOCUMENTS

| | | | | |
|---|---|---|---|---|
| 5,848,846 A | * | 12/1998 | Sugiyama et al. | 384/625 |
| 6,286,378 B1 | * | 9/2001 | Kamei et al. | 74/7 A |
| 6,315,455 B1 | * | 11/2001 | Tanaka et al. | 384/492 |
| 2003/0091256 A1 | * | 5/2003 | Grell et al. | 384/575 |
| 2004/0190808 A1 | * | 9/2004 | Maeda et al. | 384/625 |

FOREIGN PATENT DOCUMENTS

| | | |
|---|---|---|
| JP | 59-26107 Y2 | 7/1984 |
| JP | 07-113383 B2 | 7/1994 |
| JP | 2002122150 | 4/2002 |
| JP | 2006-300167 A | 11/2006 |
| WO | 2007074802 | 7/2007 |

* cited by examiner

*Primary Examiner* — Thomas R Hannon
*Assistant Examiner* — Alan Waits
(74) *Attorney, Agent, or Firm* — Sughrue Mion, PLLC

(57) ABSTRACT

Obtained is an engine starter having a structure in which, even when frictional heat is generated on a roller due to sliding of a roller and a clutch inner with respect to each other, deformation of a rolling contact surface of the roller is reduced by suppressing reduction in hardness of the rolling contact surface of the roller due to the frictional heat, thereby making it possible to improve transmission of a rotation force from a clutch outer to a clutch inner. The engine starter includes a clutch (5) for transmitting a rotation force of an output shaft (4) to a pinion gear (7), a clutch outer (10), a clutch inner (11) having one end portion facing an inner portion of the clutch outer (10) and another end portion to which the pinion gear (7) is fixed, and a roller (12) which rolls while being provided between the clutch outer (10) and the clutch inner (11). The clutch outer (10) is formed with a notch portion (10a) of a tapered shape. The notch portion (10a) is formed with a lock portion (10b) abutting the roller (12). A rolling contact surface of the roller (12) is applied with carbonitriding treatment.

1 Claim, 3 Drawing Sheets

ENGINE STARTER

BACKGROUND OF THE INVENTION

1. Field of the Invention

The present invention relates to an engine starter including an output shaft rotated by motor drive and a clutch provided to the output shaft for transmitting a rotation force applied in one direction of the output shaft to a pinion gear.

2. Description of the Related Art

Conventionally, there is known an engine starter including a driving body of a cylindrical shape having a tapered notch portion at an inner peripheral surface thereof, a rotary shaft defining a wedge-shaped space between the inner peripheral surface of the driving body and itself, and a roller provided in the wedge-shaped space and capable of rolling along a peripheral direction of the rotary shaft, in which, when the driving body rotates in one direction, the roller bites into the driving body on a narrower side of the wedge-shaped space and the rotary shaft, thereby allowing the rotation force of the driving body to be transmitted to the rotary shaft.

The inner peripheral surface of the driving body on the narrower side of the wedge-shaped space is formed with a lock portion extending inwardly in a radius direction. The roller abuts on the lock portion, thereby limiting a biting depth of the roller into the driving body on the narrower side of the wedge-shaped space and the rotary shaft (see, for example, Japanese Utility Model Application Laid-open No. Sho 59-26107)

For example, in such a case where an abnormal impact force is generated between a pinion gear and a ring gear by meshing of the rotating pinion gear and the ring gear with each other when the ring gear of an engine rotates in a reverse direction, the roller bites into the driving body and the rotary shaft, but the biting depth is limited by the lock portion, thereby causing the roller and the rotary shaft to slide with respect to each other, so damage of the ring gear or the like is prevented.

However, in this case, since the roller and the rotary shaft slide with each other, frictional heat is generated on the roller, thereby causing a rolling contact surface of the roller to be tempered. Thus, hardness of the rolling contact surface of the roller decreases.

As a result, the rolling contact surface of the roller coming into contact with the rotary shaft is deformed. Therefore, the biting depth of the roller into the rotary shaft decreases. Thus, there is a problem in that transmission of a rotation force from the driving body to the rotary shaft is reduced.

SUMMARY OF THE INVENTION

The present invention has been made to solve the above-mentioned problem, and it is therefore an object of the present invention to provide an engine starter having a structure in which, even when frictional heat is generated on a roller due to sliding of the roller and a clutch outer or clutch inner with respect to each other, deformation of a rolling contact surface of the roller is reduced by suppressing reduction in hardness of the rolling contact surface of the roller due to the frictional heat, thereby making it possible to improve transmission of a rotation force from the clutch outer to the clutch inner.

According to the present invention, there is provided an engine starter, including:
an output shaft connected to a rotary shaft of a motor and rotated by driving the motor;
a clutch which is slidably provided to the output shaft, for transmitting a rotation force applied in one direction of the output shaft; and
a pinion gear provided to the clutch and meshing with a ring gear, in which:
the clutch includes:
a clutch outer of a bottomed cylindrical shape having a bottom portion engaging with the output shaft and rotating in synchronism with the output shaft;
a clutch inner of a cylindrical shape rotatably provided to the clutch outer and having one end portion facing an inside of the clutch outer and another end portion having the pinion gear provided on an outer peripheral surface of the another end portion; and
a roller provided between the clutch outer and the clutch inner, having a rolling contact surface, and capable of rolling along a peripheral direction of the clutch outer and the clutch inner;
one of an inner peripheral surface of the clutch outer and an outer peripheral surface of the clutch inner is formed with a notch portion of a tapered shape along the peripheral direction;
the notch portion forming a wedge-shaped space defined by the clutch outer and the clutch inner has, on a narrower side the wedge-shaped space, a lock portion protruding along a radius direction and capable of abutting on the roller; and
the rolling contact surface of the roller is applied with carbonitriding treatment.

According to the engine starter of the present invention, even when the frictional heat is generated on the roller due to the sliding of the roller and the clutch outer or clutch inner with respect to each other, the deformation of the rolling contact surface of the roller is reduced by suppressing reduction in hardness of the rolling contact surface of the roller due to the frictional heat, thereby making it possible to improve transmission of the rotation force from the clutch outer to the clutch inner.

BRIEF DESCRIPTION OF THE DRAWINGS

In the accompanying drawings.

DETAILED DESCRIPTION OF THE PREFERRED EMBODIMENTS

First Embodiment

Figure 1:
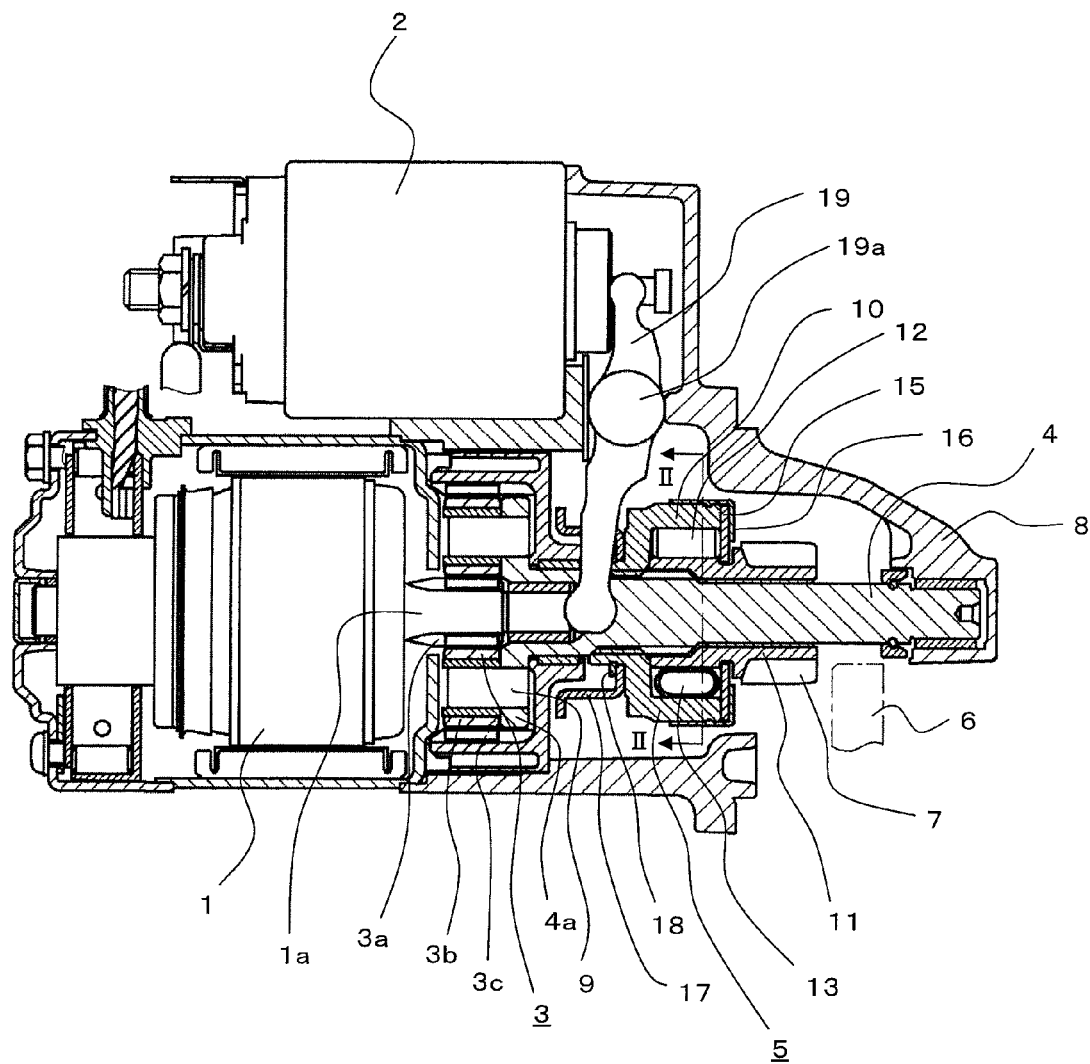
FIG. 1 is a sectional view of an engine starter according to a first embodiment of the present invention.
Figure 2:
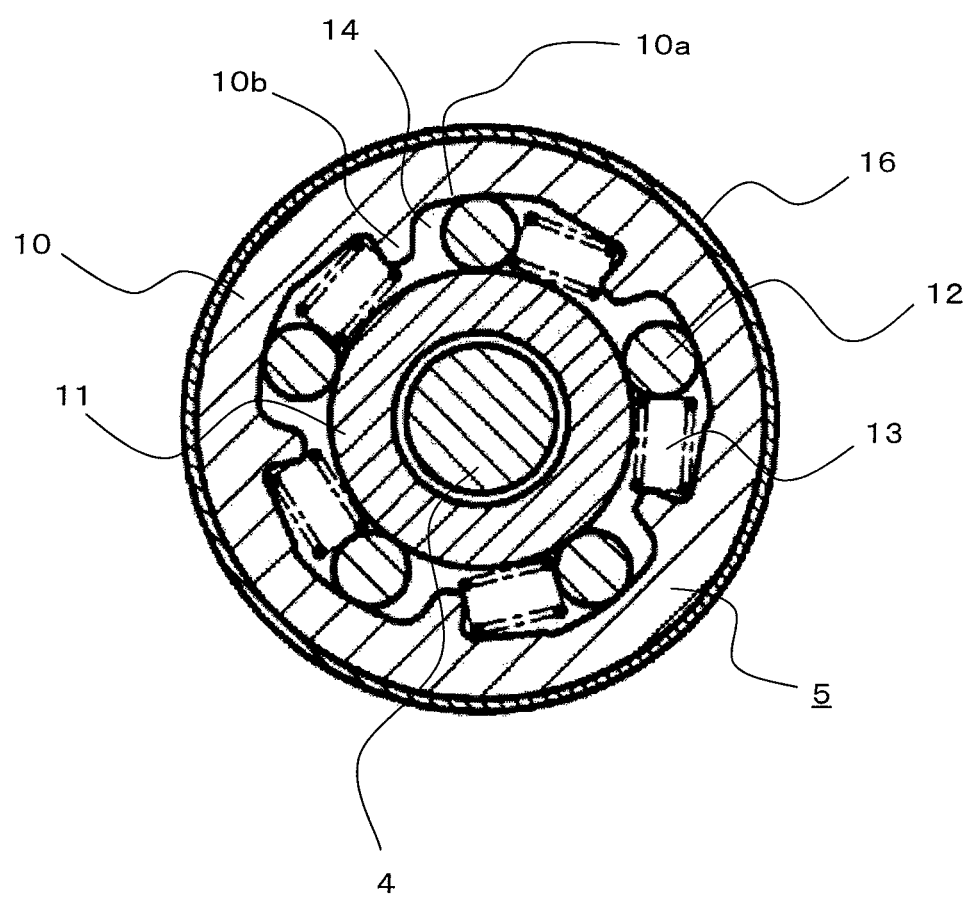
FIG. 2 is an arrow sectional view taken along the line II-II of FIG. 1.
Figure 3:
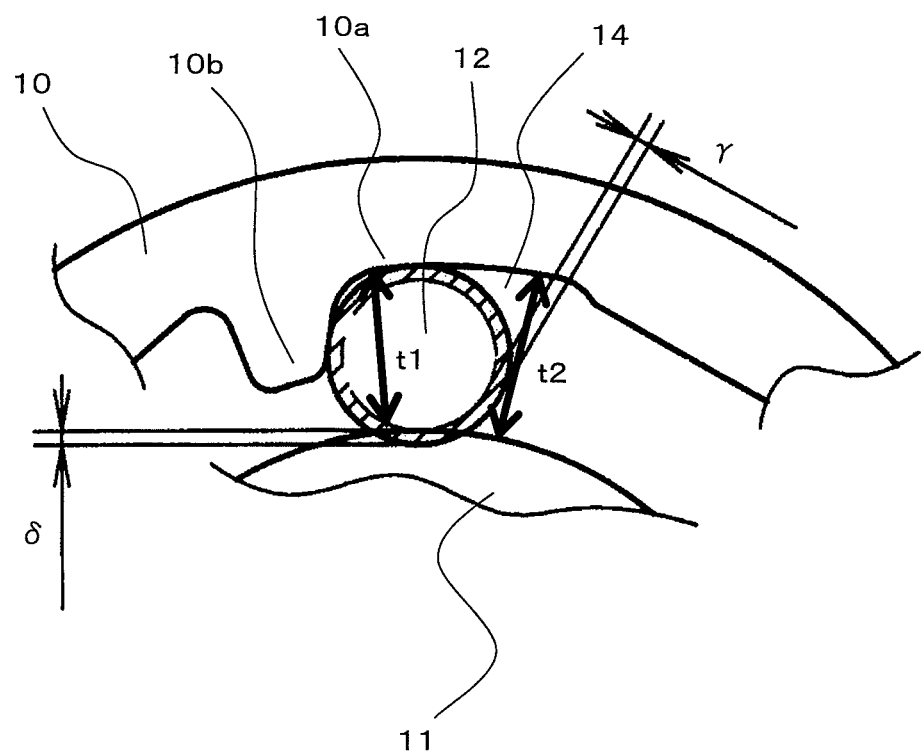
FIG. 3 is a diagram showing biting of a roller of FIG. 2 into a clutch inner.

FIG. 1 is a sectional view of an engine starter according to a first embodiment of the present invention. FIG. 2 is an arrow sectional view taken along the line II-II of FIG. 1. FIG. 3 is a diagram showing biting of a roller 12 of FIG. 2 into a clutch inner 11.

The engine starter according to the first embodiment of the present invention includes a motor 1, a switch 2 which starts and stops power application to the motor 1 by an operation of a key switch (not shown), an output shaft 4 which is provided to a rotary shaft 1a of the motor 1 through a reduction portion 3 and to which a rotation force is transmitted from the rotary shaft 1a, a clutch 5 provided to the output shaft 4 so as to be slidable along an axial direction, a pinion gear 7 provided to the clutch 5 and capable of meshing with a ring gear 6 of an engine, and a housing 8 covering the output shaft 4, the clutch 5, and the pinion gear 7.

The reduction portion 3 includes a sun gear 3a fixed to an end portion of the rotary shaft 1a of the motor 1 and rotating in synchronism with the rotary shaft 1a, a planetary gear 3b which is rotatably supported by a pin 9 fixed to a flange portion 4a formed on the output shaft 4 on a side of the motor 1 and which meshes with the sun gear 3a, and an internal gear 3c made of a resin, fixed to the housing 8, and engaging with the planetary gear 3b.

The clutch 5 includes a cylindrical clutch outer 10 engaging with the output shaft 4 to rotate in synchronism with the output shaft 4, a cylindrical clutch inner 11 rotatably provided to the clutch outer 10 and having one end portion facing an inner portion of the clutch outer 10 and the other end portion having an outer peripheral surface to which the pinion gear 7 is fixed, the rollers 12 provided between an inner peripheral surface of the clutch outer 10 and an outer peripheral surface of the clutch inner 11 so as to be capable of rolling along a peripheral direction of the inner peripheral surface of the clutch outer 10 and the outer peripheral surface of the clutch inner 11, and springs 13 each having an end connected to the roller 12.

An end portion of the clutch outer 10 on a side opposite to the motor 1 is provided with a plate 15 for limiting axial movements of the rollers 12 and the springs 13. A cover 16 for fixing the plate 15 from an outside is provided so as to extend from the plate 15 to the clutch outer 10.

To the end portion of the clutch outer 10 on the motor 1 side, a floating ring 17 having a diameter larger on a motor 1 side than on the other side is fixed by a retaining ring 18.

The switch 2 is provided with a shift lever 19 rotatable about a rotary shaft 19a. An end portion of the shift lever 19 engages with the floating ring 17 and a bottom surface of the clutch outer 10. By an operation of the switch 2, when the shift lever 19 rotates, the clutch 5 slides along the output shaft 4.

The roller 12 is made of high carbon chromium bearing steel (SUJ2) according to JIS G 4805. Note that, the roller 12 may be made of other materials.

In the inner peripheral surface of the clutch outer 10, tapered notch portions 10a are formed along the peripheral direction of the clutch outer 10. Between the inner peripheral surface of the clutch outer 10 and the outer peripheral surface of the clutch inner 11, there are formed wedge-shaped spaces 14 each having a width t1 on a narrower side and a width t2 on a wider side, the width t2 being larger than the width t1.

The notch portion 10a forming the wedge-shaped space 14 is provided with, on the narrower side, a lock portion 10b capable of abutting on the roller 12. The spring 13 can bias the roller 12 toward the lock portion 10b.

In the wedge-shaped space 14, grease (not shown) is charged for lubrication, and the plate 15 prevents the grease from leaking out.

A rolling contact surface of the roller 12 is applied with carbonitriding treatment over an entire periphery thereof, thereby suppressing hardness degradation due to frictional heat.

An effective depth γ of the rolling contact surface of the roller 12, which is applied with the carbonitriding treatment, is formed to be larger than a biting depth 5 of the roller 12 into the clutch inner 11 in a case where the roller 12 abuts on the lock portion 10b.

When the clutch outer 10 rotates in one direction, the roller 12 moves to the narrower side of the wedge-shaped space 14 and the roller 12 bites into the inner peripheral surface of the clutch outer 10 and the outer peripheral surface of the clutch inner 11, thereby fixing the clutch outer 10 and the clutch inner 11 so that a rotation force of the clutch outer 10 is transmitted to the clutch inner 11.

When a larger rotation force is applied to the clutch outer 10, while the rollers 12 bite further deeply into the inner peripheral surface of the clutch outer 10 and the outer peripheral surface of the clutch inner 11, the rollers 12 abut on the lock portions 10b, respectively, thereby causing the rollers 12 and the outer peripheral surface of the clutch inner 11 to slide with respect to each other. As a result, further transmission of the rotation force is cut off.

A magnitude of a transmission limit torque, that is, a maximum rpm transmitted from the clutch outer 10 to the clutch inner 11 is determined by the biting depth 5 of the roller 12 into the clutch inner 11 in the case where the roller 12 abuts on the lock portion 10b.

Accordingly, the biting depth 5 is set such that the magnitude of the transmission limit torque is larger than a torque required for rotating the ring gear 6 and is smaller than a torsional strength of the ring gear 6.

A surface hardness of the rolling contact surface of the roller 12 applied with the carbonitriding treatment is set to Hv600 or more and Hv900 or less.

As a result, wear of the rolling contact surface of the roller 12 can be suppressed and at the same time, occurrence of removal of the rolling contact surface of the roller 12 can be suppressed.

Next, a description will be made of an operation of the engine starter according to the first embodiment of the present invention.

First, when the key switch is operated, the switch 2 is actuated to apply power to the motor 1 and to rotate the shift lever 19.

The motor 1 applied with power rotates the rotary shaft 1a, and a rotation force thereof is transmitted to the output shaft 4 through the reduction portion 3.

When the output shaft 4 rotates in one direction and the clutch outer 10 rotates in one direction in synchronism with the output shaft 4, the each roller 12 moves to the narrower side of the each wedge-shaped space 14. The rollers 12 then bite into the inner peripheral surface of the clutch outer 10 and the outer peripheral surface of the clutch inner 11.

The rollers 12 bite into the inner peripheral surface of the clutch outer 10 and the outer peripheral surface of the clutch inner 11, thereby fixing the clutch outer 10 and the clutch inner 11 to each other.

To the clutch inner 11 fixed to the clutch outer 10, the rotation force is transmitted from the clutch outer 10, and the clutch inner 11 transmits the rotation force to the pinion gear 7.

On the other hand, due to the rotation of the shift lever 19, the clutch 5 slides along the axial direction to the side opposite to the motor 1, so the pinion gear 7 meshes with the ring gear 6 of the engine and the rotation force is transmitted from the pinion gear 7 to the ring gear 6.

After the engine has been started, when an rpm of the ring gear 6 due to the rotation of the engine is faster than an rpm of the output shaft 4, the clutch outer 10 rotates in the other direction with respect to the clutch inner 11.

When the clutch outer 10 rotates in the other direction with respect to the clutch inner 11, the each roller 12 moves from the narrower side to the wider side of the each wedge-shaped space 14, thereby releasing fixation between the clutch outer 10 and the clutch inner 11.

The fixation between the clutch outer 10 and the clutch inner 11 is released, thereby avoiding the motor 1 being dragged by the rotation force of the engine. As a result, breakage of the motor 1 due to over rotation may be prevented.

When the key switch is returned to an original state, the shift lever 19 rotates in an opposite direction, thereby disengaging the ring gear 6 of the engine and the pinion gear 7 from each other.

In a case where even when the key switch is operated and the engine do not start, the key switch is returned to the original state, thereby disengaging the ring gear 6 of the engine and the pinion gear 7 from each other.

At this time, the pinion gear 7 rotates through inertia and the ring gear 6 of the engine repeats normal rotation and reverse rotation.

In a case where when the key switch is reoperated, the engine rotates in a reverse direction, the ring gear 6 and the pinion gear 7 rotate in opposite directions from each other, thereby strongly impacting with each other.

Due to the strong impact between the ring gear 6 and the pinion gear 7, the each roller 12 of the clutch 5 moves to the narrower side of the each wedge-shaped space 14 to bite into the inner peripheral surface of the clutch outer 10 and the outer peripheral surface of the clutch inner 11 and impact with the each lock portion 10b.

The roller 12 tries to move further toward the narrower side of the wedge-shaped space 14. However, the movement of the roller 12 to the narrower side is limited by the lock portion 10b. Therefore, a biting amount of the each roller 12 into the outer peripheral surface of the clutch inner 11 is suppressed to a predetermined biting amount δ.

Since the biting amount δ of the each roller 12 into the outer peripheral surface of the clutch inner 11 is suppressed to the predetermined biting amount δ, when the clutch outer 10 rotates with a rotation force larger than a frictional force caused by the biting amount δ, the rolling contact surface of the each roller 12 and the outer peripheral surface of the clutch inner 11 slide with respect to each other, and frictional heat is generated between the rolling contact surface of the each roller 12 and the outer peripheral surface of the clutch inner 11.

However, the rolling contact surface of the each roller 12 is applied with the carbonitriding treatment. Thus, softening of the rolling contact surface of the each roller 12 due to the frictional heat is reduced.

As a result, even when the rolling contact surface of the each roller 12 and the outer peripheral surface of the clutch inner 11 slide with respect to each other, reduction in hardness of the rolling contact surface of the each roller 12 can be suppressed.

As described above, in the engine starter according to the first embodiment of the present invention, the rolling contact surface of the each roller 12 is applied with the carbonitriding treatment, so even when the frictional heat is generated on the rolling contact surface of the roller due to sliding of the rolling contact surface of the each roller 12 and the outer peripheral surface of the clutch inner 11 with respect to each other, the reduction in the hardness of the rolling contact surface of the each roller 12 due to the frictional heat is suppressed, thereby making it possible to reduce deformation of the rolling contact surface of the each roller 12 and improve transmission of the rotation force from the clutch outer 10 to the clutch inner 11.

Further, the effective depth γ of the rolling contact surface of the each roller 12, which is applied with the carbonitriding treatment is larger than the biting amount δ of the each roller 12 into the clutch inner 11 in the case where the each roller 12 abuts on the each lock portion 10b. Therefore, even in a case where the rollers 12 are worn until the biting amount into the clutch inner 11 becomes zero, the reduction in the hardness of the rolling contact surface of the each roller 12 due to the frictional heat can be suppressed.

Note that, in the first embodiment of the present invention, the description is made of the clutch 5 having a structure in which the notch portions 10a and the lock portions 10b are formed on the clutch outer 10. However, as a matter of course, this is not obligatory, and the clutch 5 may have a structure in which the notch portion and the lock portion may be formed on the clutch inner 11.

Further, in the first embodiment of the present invention, the description is made of the engine starter having the structure in which the rotary shaft 1a of the motor 1 is provided with the output shaft 4 through the reduction portion 3. However, as a matter of course, this is not obligatory, and the engine starter may have a structure in which the rotary shaft 1a of the motor 1 is directly connected to the output shaft 4.

What is claimed is:

1. An engine starter, comprising:
an output shaft connected to a rotary shaft of a motor;
a clutch which is slidably connected to the output shaft such that the clutch is slidable along an axial direction of the output shaft, the clutch for transmitting a rotation force applied in one direction of the output shaft; and
a pinion gear provided to the clutch and meshing with a ring gear, wherein:
the clutch comprises:
  a clutch outer of a cylindrical shape having a bottom portion engaging with the output shaft and rotating in synchronism with the output shaft;
  a clutch inner of a cylindrical shape rotatably provided to the clutch outer and having one end portion facing an inside of the clutch outer and another end portion, wherein the pinion gear is provided on an outer peripheral surface of the another end portion; and
  a roller provided between the clutch outer and the one end portion of the clutch inner, having a rolling contact surface, and capable of rolling along a peripheral direction of the clutch outer and the clutch inner;
one of an inner peripheral surface of the clutch outer and an outer peripheral surface of the one end portion of the clutch inner is formed with a notch portion of a tapered shape along the peripheral direction;
the notch portion forming a wedge-shaped space defined by the clutch outer and the one end portion of the clutch inner, and on a narrower side of the wedge-shaped space, a lock portion protruding along a radius direction and capable of abutting on the roller; and
the rolling contact surface of the roller is applied with carbonitriding treatment,
wherein the rolling contact surface applied with the carbonitriding treatment has an effective depth which is larger than a biting depth of the roller into one of the clutch inner and the clutch outer when the roller abuts on the lock portion.

* * * * *